United States Patent [19]

Lang

[11] 4,313,467

[45] Feb. 2, 1982

[54] CONTROL VALVE

[75] Inventor: Armin Lang, Bettringen, Fed. Rep. of Germany

[73] Assignee: Zahnradfabrik Friedrichshafen, AG., Friedrichshafen, Fed. Rep. of Germany

[21] Appl. No.: 114,388

[22] Filed: Jan. 22, 1980

[30] Foreign Application Priority Data

Jan. 25, 1979 [DE] Fed. Rep. of Germany ....... 2902751

[51] Int. Cl.³ .............................................. F16K 3/24
[52] U.S. Cl. .................. 137/625.3; 251/324
[58] Field of Search ...................... 137/625.3, 625.69; 251/324

[56] References Cited

U.S. PATENT DOCUMENTS 3,553,966 1/1971 Liebert ................................ 60/384

FOREIGN PATENT DOCUMENTS 2047692 5/1971 Fed. Rep. of Germany .
2221238 11/1973 Fed. Rep. of Germany ........................ 137/625.69

Primary Examiner—Gerald A. Michalsky
Attorney, Agent, or Firm—Zalkind & Shuster

[57] ABSTRACT

A piston valve construction effects leakage reduction in a control valve for hydraulic steering systems by reducing the wetted circumference of a portion of a piston valve collar with the use of radial recesses therein diverting a portion of flow therefrom to a groove of the piston valve which effects smoothing of turbulence of flow from said recesses followed by flow from said groove through a throttling gap to effect a laminar flow.

2 Claims, 2 Drawing Figures

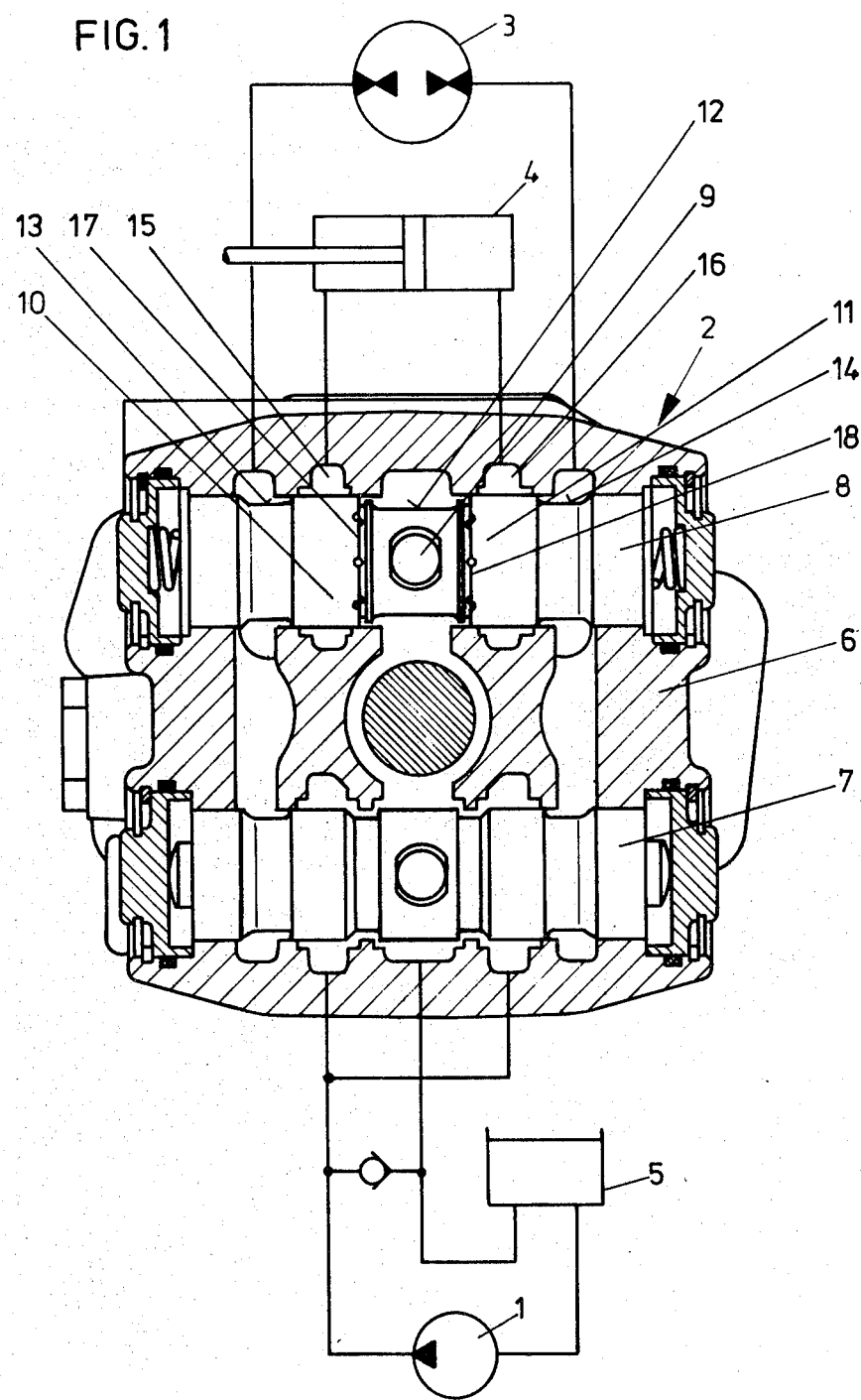

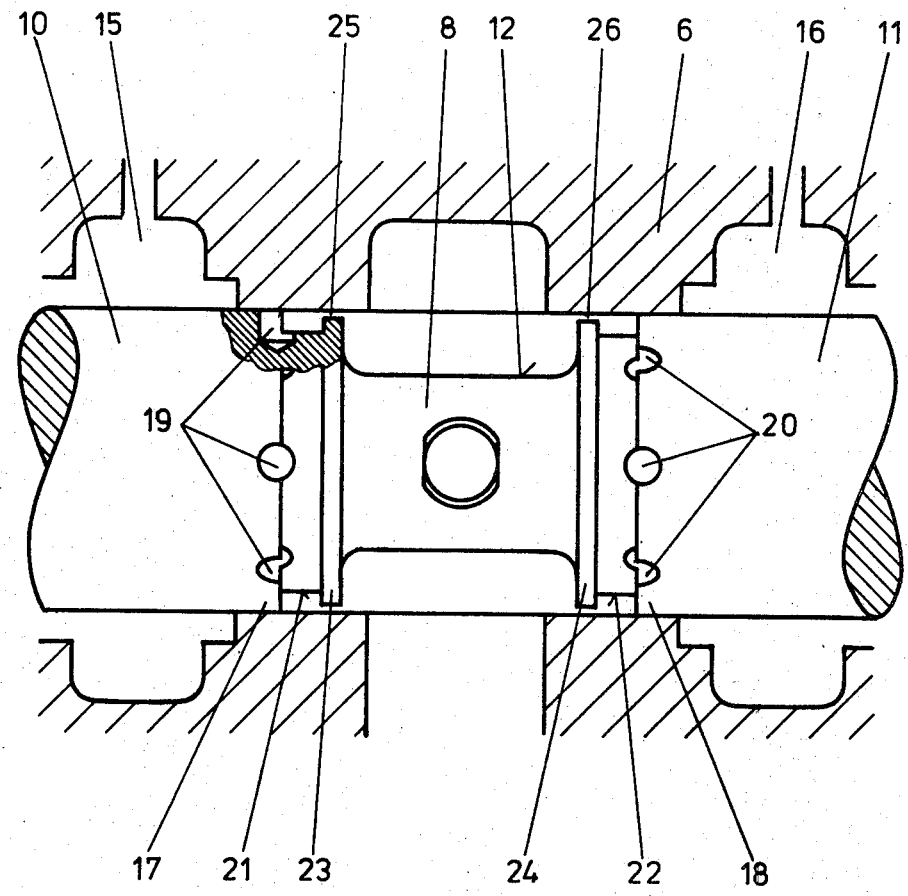

CONTROL VALVE

Control valves used in hydraulic power booster steering systems are in one form comprised of an axially shiftable piston valve within a housing wherein the housing and piston valves have coacting grooves to selectively direct flow therebetween for pressurizing and exhausting a servomotor, usually a double acting servomotor. Such reciprocal valves are common, for example, as shown in the German publications OS No. 20 47 692 published May 13, 1971 and OS No. 17 55 792, published May 13, 1971 which show the background technology for the present invention such as valve structure, and passage means from the valve housing to pumps, tanks, and servomotors, in an overall system, and are open to public inspection.

In such valves, the piston valve has one or more collars which must slide with metal-to-metal sealing within the housing with a minimum of leakage flow past the collar or collars, although a certain amount of such leakage flow is unavoidable. The leakage flow causes a lag in response between the manually operated steering wheel and the servomotor which operates the vehicle wheels for steering, a well known drawback, and an important reason for minimizing leakage flow.

Such leakage flow depends on the geometrical dimensions of gaps through which oil leakage can occur in addition to the viscosity of the oil used in any particular hydraulic system. Such dimensions which control leakage in a reciprocal valve are various gaps or unavoidable clearances in radial, axial and peripheral directions. Thus, radially the height of the gap, and axially the length of the gap, and peripherally the circumference of the gap are factors which must be taken into account.

The radial height of a gap cannot be arbitrarily reduced because of manufacturing problems and because of the friction that would be introduced. The length of an axial gap cannot be selected as to size because of practicalities of construction. Control of leakage, therefore, is reduced only by a reduction in the peripheral length of a gap, that is the circumference around a piston valve collar.

In the German publication OS No. 20 47 692, a reduction of such circumference is effected by providing radial slots at the ends of piston valve collars. However, in such arrangements, turbulence occurs due to concentration of fast high pressure flow and in hydraulic booster steering systems noise results.

The present invention discloses a piston valve construction which reduces the circumferential leakage gap, reducing noise by means of effecting a smoothed and laminar flow.

Cross reference is made to the application of Werner Tischer, filed Jan. 28, 1980, Ser. No. 115,674, for Hydrostatic Steering System.

A detailed description of the invention now follows, in conjunction with the appended drawing, in which:

FIG. 1 is a longitudinal section through a control valve of the invention with symbolic representation of a hydraulic booster steering system, and FIG. 2 shows the essential components of the invention in longitudinal section to an enlarged scale.

Referring to the drawing, a hydraulic booster steering system comprises a servo pump 1, a control valve means 2, a metering pump 3, a servomotor 4, a tank or reservoir for oil 5, and various flow passage means, all as required for operation of the system for purposes of power steering. The particular construction of additional details of the arrangement are shown and described in German patent publication OS No. 16 55 792, and need not be set forth here.

In the present invention, there is provided a valve housing 6, a pilot piston valve 7 and a distributor piston valve 8.

Piston valve 8 is actuated in a known manner by an operating pin 9 for selective pressurizing and exhausting of the pressure chambers of servomotor 4 and comprises a pair of spaced collars 10 and 11, the collars being spaced by an intermediate groove 12 of the piston valve. Outer piston ring grooves 13 and 14 are also provided for connection to the sides of metering pump 3. Spaced housing grooves 15 and 16 connect to respective pressure chambers of the servomotor and are normally closed in neutral, straight ahead steering position by respective collars 10 and 11. Annular groove 12 connects continuously with the housing groove which connects with tank 5.

The details of the above arrangement and mode of operation are not essential to the present invention and will be understood from the German patent publication OS No 17 55 792.

The particular invention resides in providing piston valve collars 10 and 11 with respective radial bore recesses 19 and 20 angularly spaced at the respective collar ends 17 and 18 adjacent the piston valve groove 12. The bores or recesses 19 and 20 are preferably radially drilled or otherwise provided blind bores which will be noted as being stepped in that they protrude into the respective collars 10 and 11 and include removal of some material from adjoining respective grooves 21 and 22, the grooves having, of course, a smaller diameter than the collars. By the use of such angularly spaced bores which provide a wide latitude for depth, size and quantity, a very precise determination necessary for favorable control of leakage oil is possible. The grooves 21 and 22 at the respective ends 17 and 18 of collars 10 and 11 are collecting chambers for damping or smoothing turbulent flow coming from recesses 19 and 20 and constitute flow smoothing chambers. Such grooves 21 and 22 are demarcated in length by axially narrow respective piston collars 23 and 24 of somewhat reduced diameter within housing 6 to effect respective annular flow throttling gaps 25 and 26.

Thus, the smoothed outlet flow from the chambers 21 and 22 is transformed to a laminar flow by the respective throttling gaps 25 and 26.

This effect is achieved by the fact that the flow area through the throttling gaps is small compared to the wetted periphery of the respective collars 25 and 26 whereby a correspondingly small Reynolds number ensues.

The same arrangement of flow smoothing or damping can be used, it desired, at the other ends of the piston valve collars 10 and 11 adjacent grooves 13 and 14, respectively.

What is claimed is:

1. In a control valve havinng a housing and a piston valve reciprocal in a bore of said housing;

said piston valve having at least one collar (10) coacting with a housing groove (15); the improvement which comprises a groove (21) at an end (17) of said collar demarcated by a collar (25) of smaller diameter than said the housing bore to effect a flow throttling gap therebetween;

and radial recess means (19, 20) arrayed around said collar and extending into said latter groove for permitting flow between said collar end (17) and said latter groove (21) and therefrom through said throttling gap when said piston valve and said housing groove are relatively positioned to conduct flow;

wherein said radial recess means limits the leakage circumference of said end (17) of said collar, and said groove (21) at said end of said collar effects smoothing of turbulence and said throttling gap effects a laminar flow downstream of said latter groove, to reduce flow noise.

2. In a control valve as set forth in claim 1, said radial recess means comprising angularly spaced radial bores in said collar of a diameter intersecting said groove (21) at the end (17) of said collar.

* * * * *